United States Patent [19]
Coley et al.

[11] 4,081,852
[45] Mar. 28, 1978

[54] GROUND FAULT CIRCUIT BREAKER

[75] Inventors: Kenneth R. Coley, Fairfield; John J. Misencik, Shelton, both of Conn.

[73] Assignee: Westinghouse Electric Corporation, Pittsburgh, Pa.

[21] Appl. No.: 645,587

[22] Filed: Dec. 31, 1975

Related U.S. Application Data

[63] Continuation of Ser. No. 511,895, Oct. 3, 1974, which is a continuation of Ser. No. 287,921, Sep. 11, 1972 both abandoned.

[51] Int. Cl.² .................................................. H02H 3/28
[52] U.S. Cl. ...................................... 361/45; 361/115; 335/37
[58] Field of Search ................. 317/18 D, 58; 337/54; 335/37; 361/45, 44, 115

[56] References Cited
U.S. PATENT DOCUMENTS

| | | | |
|---|---|---|---|
| 3,254,176 | 5/1966 | Gelzheiser | 335/37 |
| 3,636,482 | 1/1972 | Edmunds | 361/45 X |

*Primary Examiner*—J. D. Miller
*Assistant Examiner*—Patrick R. Salce
*Attorney, Agent, or Firm*—L. P. Johns

[57] ABSTRACT

Ground fault circuit breaker structure characterized by an insulating integral housing having a pair of side-by-side compartments that are separated by a partition wall. A circuit breaker is located in one compartment and a ground fault detector is located in the other compartment and isolated from the circuit breaker. The ground fault detector comprises a differential transformer comprising a current monitoring core, a plurality of primary windings on the core, each being one of a line and a neutral conductor of an A.C. electrical distribution system, a secondary winding sensing current unbalance between the primary windings, means responsive to a predetermined sensing signal to open the line conductor; and the line conductor extending between the circuit breaker trip means and through aperture means in the partition wall and through the magnetic core and back through the aperture means to the load terminal. The means responsive to a predetermined sensing signal including a pivotally movable member extending through the aperture means and movable against the trip member to unlatch the trip member.

1 Claim, 11 Drawing Figures

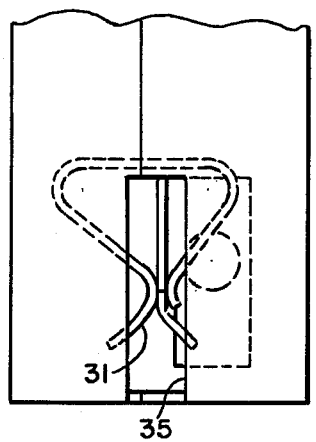
FIG. 8
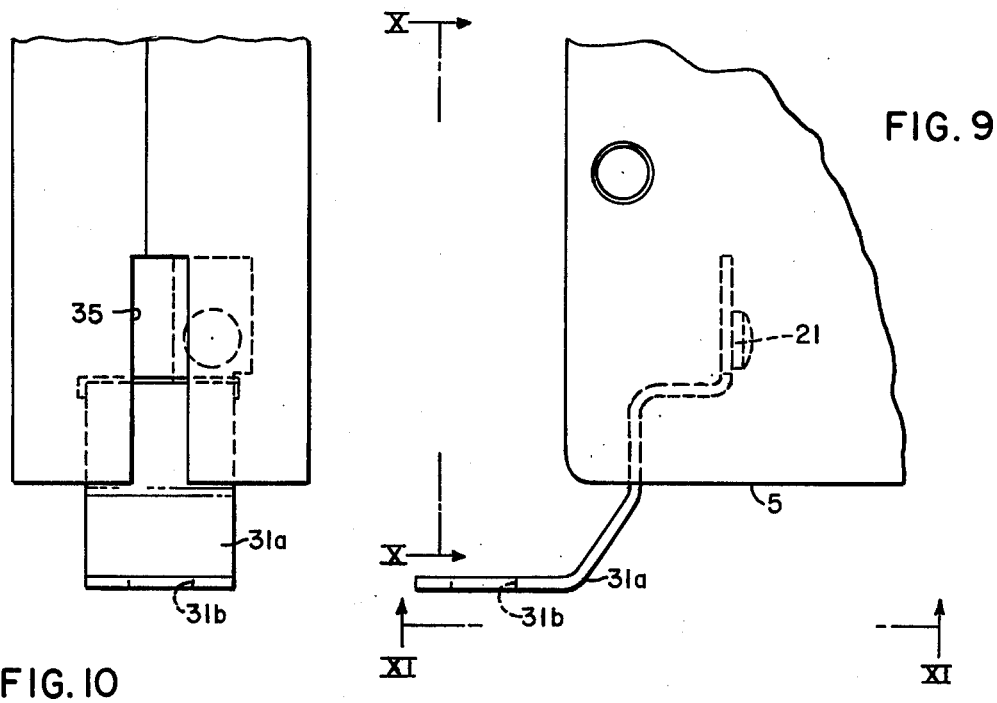
FIG. 9
FIG. 10
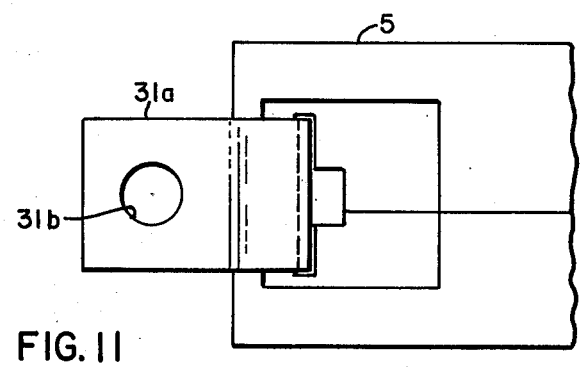
FIG. 11

GROUND FAULT CIRCUIT BREAKER

This is a continuation of application Ser. No. 511,895 filed Oct. 3, 1974, which is a continuation of Ser. No. 287,921, Sep. 11, 1972, both now abandoned.

CROSS REFERENCE TO RELATED APPLICATIONS

This invention is related to an invention disclosed in the application of Edsel W. Frantti and Francis L. Gelzheiser, Ser. No. 219,710, filed Jan. 21, 1972, and an invention disclosed in the application of Kenneth R. Coley, Ser. No. 219,391, filed Jan. 20, 1972.

BACKGROUND OF THE INVENTION

1. Field of the Invention

This invention relates to ground fault interrupter apparatus of the differential transformer type and more particularly it pertains to a ground fault detector in side-by-side position with a circuit breaker.

2. Description of the Prior Art

It is important in ground fault protection to have three essential functions basically combined into a single unit; namely, overload protection, short circuit protection, and ground fault protection. Essentially a circuit breaker provides the overload and short circuit protection, however, the ground fault protection has been, in earlier systems, provided as an add-on structure to the circuit breaker. One difficulty with the add-on structure is that it adds to the total bulk of the original circuit breaker and is therefore not usually readily adaptable to installation on the load center or a panelboard by the conventional plug-in or bolt-on method.

Associated with the foregoing is a problem of providing a unified ground fault-circuit breaker having enhanced operating capabilities, unique construction, and relatively low cost. Heretofore, circuit breakers having ground fault units added on have been too large to replace the conventional circuit breaker, such as used in the load center or panelboard of a commercial or residential building. In a miniature ground fault unit, it is necessary to completely design the electronic sensor, amplifier, and solenoid tripping means in such a way that a miniature relationship is maintained without destroying or impairing the performance of a circuit breaker. Accordingly, there is a need for a new and improved ground fault current interrupter circuit breaker unit which has a dimension corresponding to that of the conventional circuit breaker.

Moreover, it is important that the operating parts of the ground fault detector and the circuit breaker be separated from each other. One reason for that is to prevent the electronic members of the ground fault detector from becoming contaminated by debris occurring during opening and closing of the contacts of the circuit breaker, such as interruption of the arc and carbon heat, which would otherwise affect the reliability of the overall structure.

SUMMARY OF THE INVENTION

It has been found in accordance with this invention that an integrated ground fault circuit breaker structure can be provided for use in original installations as well as replacement of conventional circuit breakers mounted on load centers or panelboards. The ground fault circuit breaker device of this invention comprises a circuit breaker, a ground fault detector, and a unitized insulating housing therefor, which housing has a partition wall forming first and second compartments therein, the partition having aperture means therethrough; the circuit breaker being in the first compartment and comprising a pair of cooperable contacts operable between open and closed positions, an operating mechanism for operating the contacts and comprising a latched pivotally supported trip member, trip means for latching the trip member, a load terminal structure, a line conductor of an A.C. electrical distribution system connecting the trip means to the load terminal structure; the ground fault detector being in the second compartment and comprising a current monitoring core, a plurality of primary windings on the core, each being one of the line and a neutral conductor of the A.C. electrical distribution system, a secondary winding sensing current unbalance between the primary windings, means responsive to a predetermined sensing signal to open said line conductors; the line conductor extending between the trip means and through the aperture means and through the magnetic core and back through the aperture means and to the load terminal structure, and the means responsive to a predetermined sensing signal including a pivotally movable member extending through the aperture means and movable against the trip member to unlatch the trip member, whereby the circuit breaker and the ground fault detector are isolated from each other and contained within an integral housing.

The advantage of the ground fault circuit breaker structure of this invention is that it is an integrated unit in which a circuit breaker and a ground fault detector or sensor are contained within isolated compartments of the housing of the unit. Moreover, the overall size of the unit is such that a standard size circuit breaker may be replaced by the unified ground fault circuit breaker structure of this invention in a direct one-for-one replacement.

BRIEF DESCRIPTION OF THE DRAWINGS

FIG. 8 is a fragmentary end view of the lower portion of the housing taken on the line VIII—VIII of FIG. 4;

FIG. 9 is a fragmentary view of the lower corner portion of the housing, showing another embodiment of the invention;

FIG. 10 is a fragmentary end view of the lower portion of the housing taken on the line X—X of FIG. 10; and FIG. 11 is a fragmentary bottom view taken on the line XI—XI of FIG. 10.

DESCRIPTION OF THE PREFERRED EMBODIMENT

Figure 1:
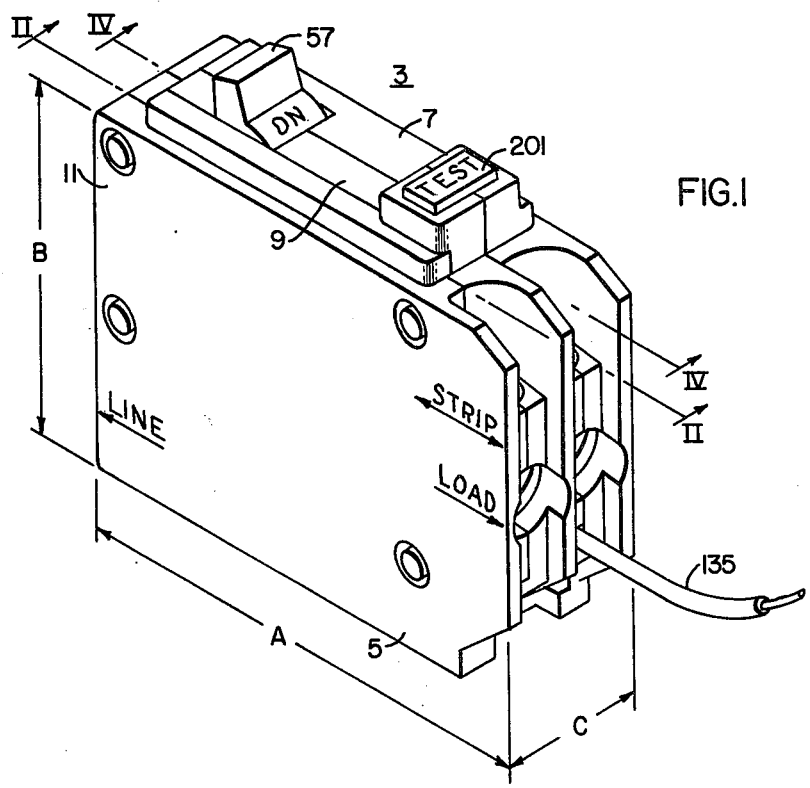
FIG. 1 is a perspective view of the ground fault circuit breaker structure of this invention.

In FIG. 1 a ground fault circuit breaker structure is generally indicated at 3 and it comprises a housing 5 which is composed of electrically insulating material such as a thermosetting resin. The housing 5 includes a pair of tray portions 7 and 9 and a side cover 11, which are secured in place by suitable means such as rivets 12 (FIG. 2) in a conventional manner.

The ground fault circuit breaker structure 3 has dimensions of length, height, and width indicated by the arrows A, B, and C, respectively, in FIG. 1. The length A, is approximately 3.18 inches; the height B, is approximately 2.38 inches; and the width C, is approximately 1 inch. With those dimensions the structure 3 is adapted to fit into the conventional load center box and panel cover. The width of 1 inch also enables the structure 3 to be used with the load center line stabs that are on 1 inch center lines.

Figure 5:
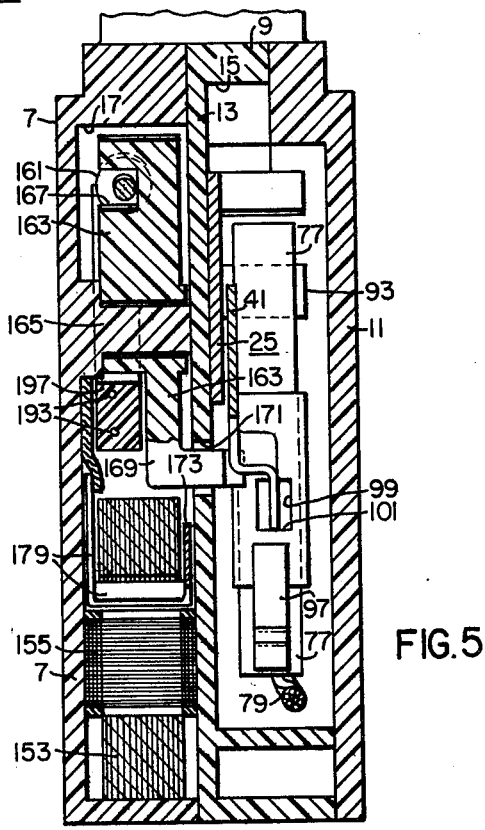
FIG. 5 is a sectional view taken along the line V—V of FIG. 4.

As shown in FIG. 5 the tray portion 7 comprises a back wall 8 and the tray portion 9 comprises a back wall 13 that serves as a partition wall which extends between compartments 15 and 17 formed between the back walls 8 and 13 and the side cover 11.

Figure 2:
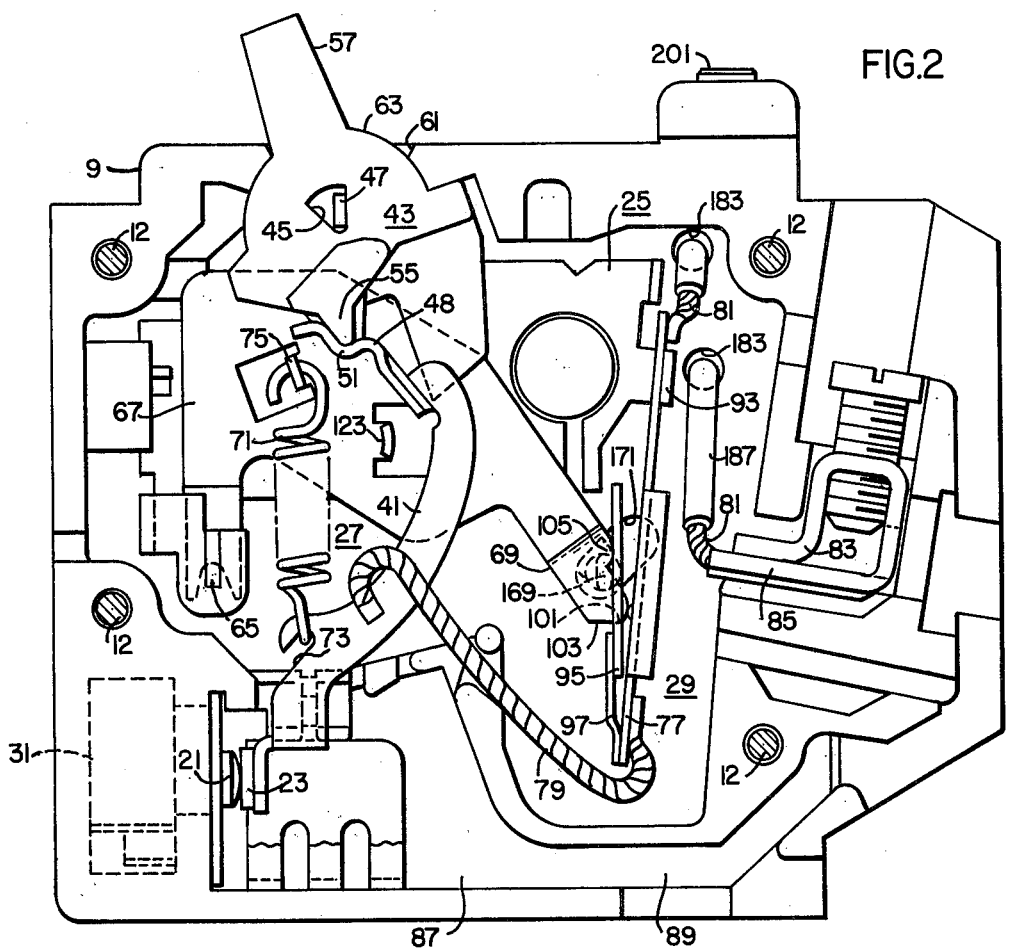
FIG. 2 is a vertical sectional view taken on the line II—II of FIG. 1 and showing the circuit breaker side of the invention and in the closed position.
Figure 4:
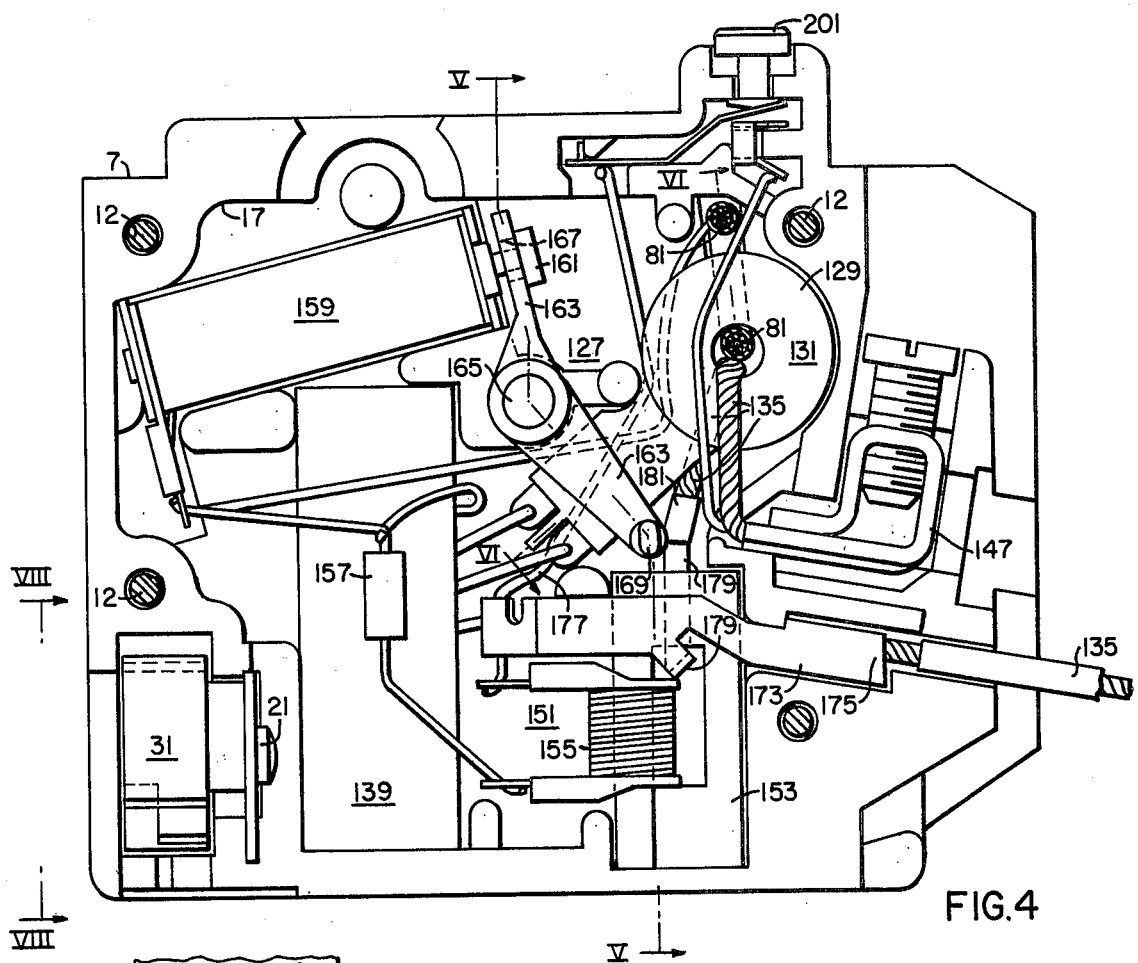
FIG. 4 is a vertical sectional view taken on the line IV—IV of FIG. 1 showing the ground fault detector side of the invention.

As shown more particularly in FIGS. 2 and 4 a circuit breaker mechanism is disposed within the compartment 15 (FIG. 2) and a ground fault circuit interrupter is disposed within the compartment 17 (FIG. 4).

The circuit breaker structure is of the type disclosed in U.S. Pat. No. 3,566,318, issued Feb. 23, 1971 to F. L. Gelzheiser et al, to which reference is made for a complete description of the structure and operation. Briefly, the circuit breaker mechanism comprises a stationary contact 21, a movable contact 23, a supporting metal frame 25, an operating mechanism 27, and a trip device 29.

The stationary contact 21 is welded, or otherwise secured to a clip-on line terminal 31 that is disposed within opening or plug-in cavity 35 (FIG. 8) to resiliently engage a blade or stab in a load-center or panelboard when the circuit breaker is mounted in the operating position. The opening 35 is preferably located centrally between opposite sides of the housing 5 and at the corner of an end wall 36 and a bottom wall 37 of the housing.

Figure 3:
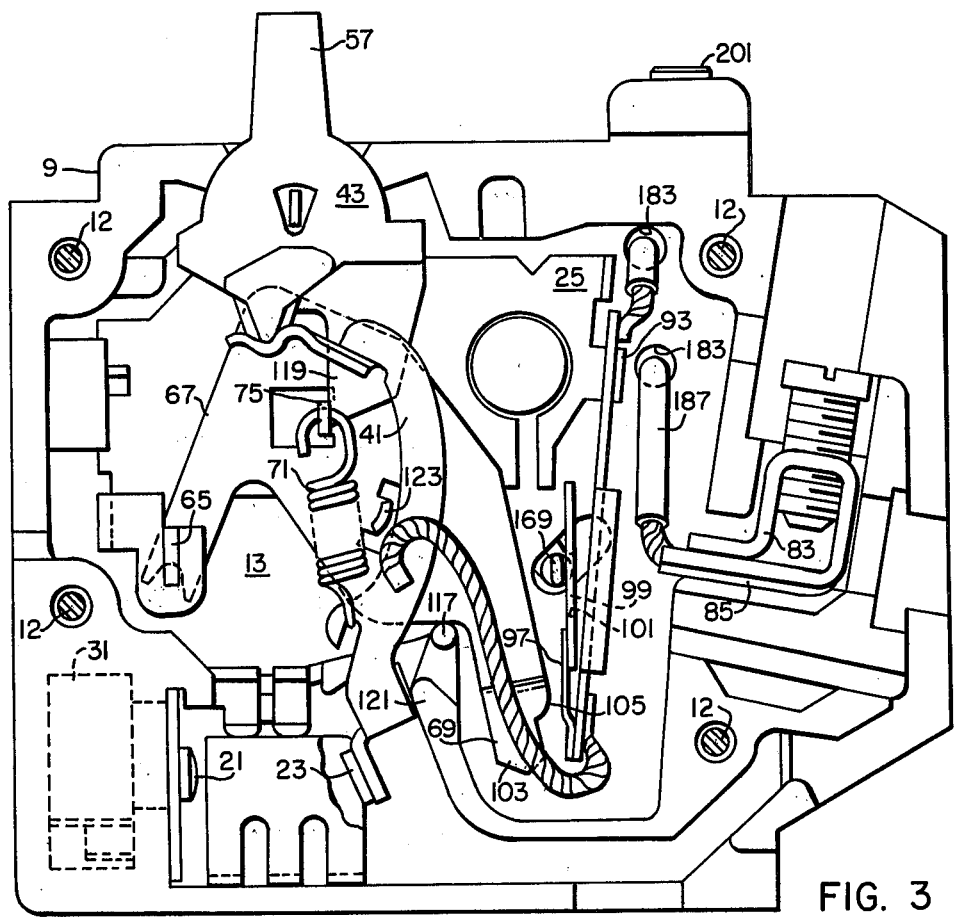
FIG. 3 is a view similar to FIG. 2 with the breaker shown in the tripped position.

Referring to FIGS. 2 and 3, the stationary contact 21 cooperates with the movable contact 23 that is welded or otherwise secured to a small flange portion of a flat metallic generally C-shaped contact arm 41. Means for operating the contact arm 41 to the open and closed positions comprises an operating member indicated generally at 43 having a V-shaped opening 45 therein, which opening receives a projection 47 of the stationary metallic frame 25. The operating member 43 is biased outwadly or upward as seen in FIGS. 2 and 3, by means to be hereinafter described, to a position wherein the lower edges of the projection 47 pivotally engage the lower side walls of the V-shaped opening 45. The contact arm 41 is bent over at its upper end at 48, and a slot is provided in the part 48. Depressions 51 are formed in the part 48 on opposite sides of the slot. When the parts are in operating position, a molded projection integral with the operating member 43 extends into the slot of the contact arm 41 to position the operating member 43 relative to the contact arm 41, and pivoting portions 55 on opposite sides of the projection pivotally engage in the depressions 51 of the contact arm 41. The operating member 43 has a handle portion 57 molded integral therewith which extends through an opening 61 in the housing, whereby the mechanism may be manually operated to open and close the breaker. Arcuate surfaces 63 on opposite sides of the handle 57 substantially close the opening 51 in all positions of the operating member 43. Motion is transmitted from the operating member 43 to the contact arm 41 when the breaker is manually operated and from the contact arm 41 to the operating member 43 when the breaker is automatically tripped.

The frame 25 supports an insulating pivot 65. A releasable member 67 is pivotally supported at one end thereof on the pivot 65. The other end 69 of the releasable member 67 is latched by the trip device 29 in a manner to be hereinafter specifically described. Except for the trip device 29, the operating mechanism is more specifically described in the U.S. Pat. No. 3,254,176 issued to F. L. Gelzheiser.

As is more specifically described in said patent No. 3,254,176, the ends of the releasable member 77 are offset and disposed along a plane which is parallel to a plane in which the main body portion of the releasable member 67 is disposed. A spring 71 is connected, under tension, at one end in a slot 73 in contact arm 41, and at the other end in a slot projection 75 that extends from the main body portion of the releasable member 67.

The contact arm 41 is electrically connected to the lower end of a bimetal 77 by means of a flexible conductor 79. The bimetal 77 is part of the trip device 29. A flexible conductor 81 connects the upper end of the bimetal 77 with a terminal strap 83 that extends through an opening in the end wall of the housing. A terminal connector 85 is connected to the external end of the terminal strap 83 to permit connection of the circuit breaker in a circuit in a manner well known in the art. The closed circuit through the circuit breaker 9 extends from the terminal 31 through the stationary contact 21, movable contact 23, contact arm 41, flexible conductor 79, current-carrying bimetal 77, flexible conductor 81, to the terminal strap 83 by means of the terminal connector 85. Since the movable contact arm 41 extends downwardly from its pivot, the arc is established adjacent the bottom of the housing in an arc chamber 87 which is connected by a vent passage 89 to an opening in the end of the housing beneath the terminal connector 85.

When the releasable member 67 is in the latched position shown in FIGS. 2 and 3, the circuit breaker may be manually operated by operation of the operating member 43. Movement of the operating member 43 in a clockwise direction from the "on" or closed position seen in FIG. 2 to the "off" or open position seen in FIG. 3. The spring 71 biases the contact arm 41 upward into engagement with the operating member 43 to bias the operating member 43 against the lower edges of the projection 47 about which the operating member 43 pivots. Movement of the operating member 43 in a counterclockwise direction from the "off" position seen in FIG. 3 to the "on" position seen in FIG. 2 moves the upper end of the switch arm to the right of the line of action of the spring 71 to move the contact arm 41 to the closed position.

The trip device 29 comprises the elongated bimetal 77. The bimetal 77 is a flat member that is secured at the upper end thereof to a projection 93 of the stationary frame 25. The frame 25 is a flat member that is secured in place in the housing between projections of the molded insulating housing, and the projection 93 over to extend and in a direction generally normal to the plane of the flat supporting plate 25. An elongated rigid magnetic armature or latch member 95 is mounted on a spring 97 that is welded to the high expansion side of the bimetal 77. The armature 95 extends upward along the high expansion side of the bimetal 77 in a parallel relationship with the bimetal 77 when the bimetal is in the cold or straightened condition. The armature 95 has an opening 99 therein to form a latch surface 101 at the base of the opening. The latch end 69 of the releasable member 67 is formed with a latch surface 103 thereon and a stop surface or fulcrum part 105 thereon. The armature 95 serves as a stop to engage the fulcrum part 105 of the releasable member 67 in the latched position of the releasable member. A U-shaped magnetic member 109 is mounted on the bimetal 77 with opposite legs being positioned on opposite sides of the bimetal.

The circuit breaker is shown in FIG. 2 in the reset position wherein the releasable member 67 is latched on the armature 95. The circuit breaker can be manually operated only when the releasable member 67 is in the reset or latched position. In the position seen in FIG. 2, the bimetal 77 is based toward the releasable member 67 and engages the fulcrum part 105 of the rigid releasable member 67. In this position, the latch surface 103 of the releasable member 67 rests on the latch surface 101 of the armature 95 to latch the releasable member 67 thereby preventing clockwise movement of the releasable member 67 about the pivot 65. The high expansion side of the bimetal 77 is on the left as seen in FIG. 2. Upon the occurrence of a sustained lesser overload current above a first predetermined value, the bimetal 77, which is heated by the current flowing therethrough, deflects from the position seen in FIG. 2 to a thermally-tripped position. The bias of the complete bimetal 77 toward the left maintains the armature 95 against the fulcrum part 105 during the deflection of the bimetal 77 to a thermally-tripped position. The bimetal 77 deflects to a curvature such as that during movement when the rigid armature 95 is angled to the position with the lower end of the rigid armature 95 being carried by the lower end of the bimetal 77, and the armature 95 moves about the fulcrum part 105 with a levering action to move the latch surface 101 of the armature 95 free of the latch 103 of the releasable member 67 to thereby release the releasable member 67.

When the releasable member 67 is released, the spring 71 acts to rotate the releasable member 67 in a clockwise direction about the pivot 65 until the releasable member 67 is stopped by engagement thereof with a molded projection 117 on the housing part 13. During this movement, the line of action of the spring 71 moves to the right on the pivot 55, 51, whereupon the spring 71 biases the contact arm 41 in the opening direction and moves the contact arm 41 so that the line of action of the force exerted by the spring on the operating member 43 shifts across the pivot 45, 47 and actuates the operating member 43 to the tripped position shown in FIG. 3. The tripped position of the operating member 43 is intermediate the "on" and "off" positions. The operating member 43 is stopped in the intermediate or tripped position seen in FIG. 3 when an insulating projection 119 thereon engages the projection 75 on the releasable member 67. The contact arm 41 is stopped in the open position seen in FIG. 3 when it engages an insulating projection 121 molded integral with the partition wall 13. Positive separation of the contacts is provided during a tripping operation by means of a projection 123 extending from the releasable member 67. If the contacts are slow in opening due to sticking, drag or other reasons, the projection 123 engages the inner edge of the contact arm 41 to start the contact arm in the opening direction. The circuit breaker is trip-free in that the breaker will atomatically trip open even if the handle 57 is held in the closed position.

Following a tripped operation, it is necessary to reset the breaker before the breaker can be operated. This is accomplished by moving the operating member 43 from the tripped position (FIG. 3) slightly beyond the full "off" position. During this movement, the projection 119 on the operating member 43 operates against the projection 75 of the releasable member 67 to move the releasable member 67 counterclockwise to a position, wherein the latch surface 103 of the releasable member 67 is just above the latch surface 101 of the armature 95. The spring 91 then moves the bimetal 77, which cools and straightens when in non-current carrying tripped condition, and armature 95 toward the releasable member to latch the trip member in an initial operating position. with the releasable member 67 reset in the operating position, the circuit breaker can be manually operated in the same manner as was hereinbefore described.

The circuit breaker is instantaneously tripped upon the occurrence of a short circuit or severe overload current above a second predetermined value, higher than the first predetermined value, by operation of the magnetic trip of the trip means 29. As can be understood with reference to FIG. 2, the current passing through the bimetal 77 generates magnetic flux which operates through the armature 95, the air gaps between the armature 95 and the magnetic member 109, and through the stationary magnetic member 109. When the current reaches the second predetermined value, this magnetic flux is strong enough to attract the armature 95 toward the stationary magnetic member 109, and the spring 97 flexes permitting the armature 95 and bimetal 77 to move as a unit to the magnetically-tripped position seen in FIG. 3 wherein the releasable member 67 is releasable to trip the breaker in the same manner as was hereinbefore described. Following a magnetic tripping operation, the circuit breaker is reset and relatched in the same manner as was hereinbefore set forth with regard to the time-delay thermal tripping operation. The bimetal 77 and armature 95 are shown in the attached position in FIG. 3. It can be understood that when the circuit is interrupted the armature 95 will no longer be attracted to the stationary magnetic member 109 and returns the bimetal 77 and armature 95 to the unattracted position.

The ground fault detector or actuator in compartment 17 is generally indicated at 127 in FIG. 4 and is employed to avoid the adverse affects of the grounded neutral condition. Copending application Ser. No. 158,337, filed June 30, 1971 by K. R. Coley, J. J. Hisencik, and J. R. Reeves, and assigned to the assignee of the present invention, relates to a grounded neutral detection structure using capacitive means connected between the neutral conductor and the line conductor. Upon the occurrence of a grounded neutral, the capacitive means becomes charged and results in an unbalanced condition appearing on the neutral and line conductors which is sufficient to cause tripping of the circuit breaker. This effect may be used with an additional magnetic core on the input side of the neutral conductor in order to limit current therein and permits use of a smaller capacitor. Alternately, a magnetic core around the neutral conductor on the input side can be used to provide an effective impedance that avoids the problems of the grounded neutral condition even in the absence of the abovementioned capacitive means.

Figure 7:
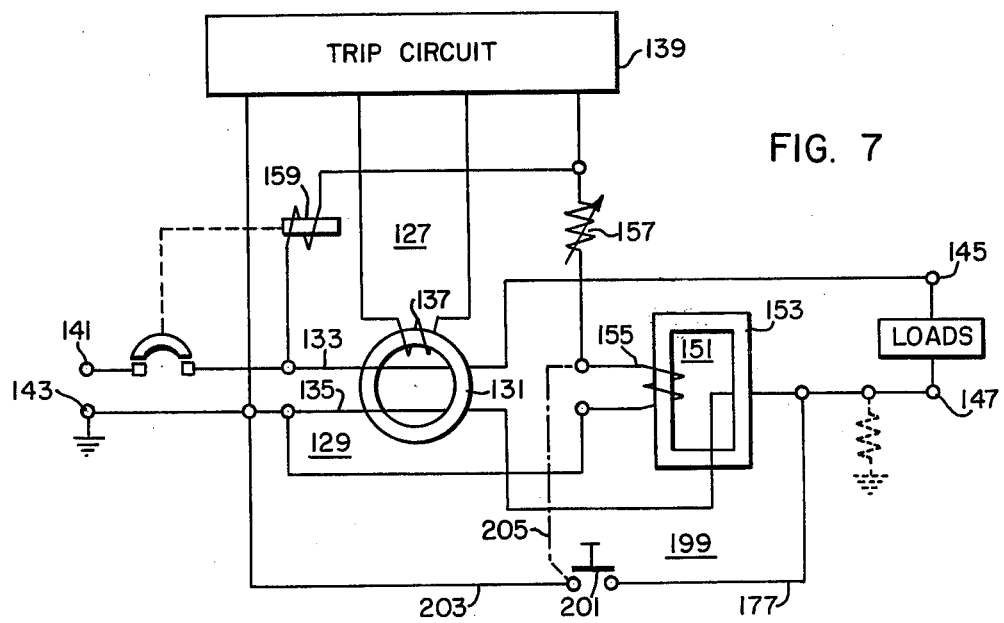
FIG. 7 is a diagram showing the electrical circuit of the invention.

In FIG. 7, the ground fault detector 127 of the differential transformer type is shown schematically wherein a differential transformer 129 having a toroidal core 131 is provided with conductors including a line conductor 133 and a neutral conductor 135. The conductors 133 and 135 extend through the core 131 as primary windings, each preferably of a single turn although multiple turn windings may be used if desired. The illustration of the conductors is merely schematic and in accordance with a preferred form. The conductors 133 and 135 are in coaxial arrangement as they pass through the core 131 as disclosed in copending application Ser. No. 158,338, filed June 30, 1971 by J. R. Reeves et al and assigned to the present assignee.

A sensing winding or sensor 137, usually of a plurality of turns, is provided on the core 131 for sensing an imbalance in the conduction current levels of the primary conductors. Such an imbalance produces a sensed current in the winding 137 which, if of sufficient magnitude and occurring for a sufficient time, actuates a trip circuit 139 in order to actuate the circuit breaker on the conductors 133 and 135 on the input side of the differential transformer 129. The trip circuit 139 may be of various known types including, for example, those disclosed in the above-mentioned copending application Ser. No. 158,338. The ground fault circuit interrupter 127, the trip circuit 139, and the circuit breaker are shown in copending application Ser. No. 219,710, filed Jan. 21, 1972, by E. W. Frantti and F. L. Gelzheiser and assigned to the present assignee.

The circuit illustrated is merely exemplary. The invention may also be embodied in a circuit having more than two conductors, such as a single phase, three wire system or a three phase, four wire system. Terminals 141 and 143 on the input side are for connection to a power source or supply. One or more loads to be energized by the system may be connected to terminals 145 and 147 on the output side.

If a ground fault occurs on the line conductor 133 in the load circuit, without a grounded neutral condition, the operation of the apparatus is essentially straightforward in accordance with past practice. If a leakage path to the ground occurs from the neutral conductor on the load side of the transformer, as indicated by the path 149 to ground, which may have some impedance, the apparatus so far described would not be sensitive to line conductor grounds and would prevent an unknown hazard to those relying on the protection of the apparatus. The problems resulting from a grounded neutral condition are particularly serious when a load is not connected to the system.

As shown in copending application Ser. No. 218,771, filed Jan. 18, 1972, by K. R. Coley and J. J. Misencik, and assigned to the present assignee, an output transformer 151 of the current sensing type is provided on the load side of the sensor of differential transformer 129. The output transformer 151 has a core 153 on which a primary winding 155 is provided. The winding 155 is a conductor connected between the line and neutral conductors 133 and 135 of the system. To minimize the losses in the primary winding 155 and to enable use of a small cross-section conductor a current limiting means such as a resistance 157 is interposed in series with the primary on the side of the line conductor 133. In most applications a resistance of 10,000 to 35,000 ohms is suitable. The secondary of the output transformer 151 is the neutral conductor 135 preferably in a single turn. It is preferred that the ratio of primary to secondary turns be high, such as at least 1,000:1, because such a higher ratio of turns permits use of a smaller curve. The output transformer 129 improves reliability of the ground fault circuit breaker structure and provides protection defined under Underwriters Laboratories and CSA specifications. However, the output transformer may be omitted without altering the basic ground fault protection provided by the differential transformer 129.

In operation, in the absence of any load on the output terminals and also in the absence of any ground on the neutral conductor, a current path with minor losses is completed through the line conductor 133, the primary winding 155, and the neutral conductor 135. The polarities of the windings of the output transformer 151 are not significant and the benefits are obtained whether or not they are the same as the primary windings of the transformer 129.

Structurally the ground fault detector 127 is shown in FIG. 4. The several parts including the differential transformer 129, the trip circuit 139, and the output transformer 151 are mounted within spaced formed projections comprising integral parts of the intermediate portion 7 of the housing on the side of the compartment 17. Accordingly, the several elements are retained in place upon attachment of the cover 11.

More particularly, the trip circuit 139 includes a solenoid 159 having a plunger with an outer end 161. A lever 163 is mounted on a pivot pin 165 which is a molded portion of the back wall 8. The lever 163 has a notch 167 (FIG. 5) which engages the solenoid plunger adjacent the outer end 161 thereof. The lower end of the lever 163 includes an integral projection or prong 169 which, as shown in FIG. 5, extends through an opening 171 in the partition wall 13. The end of the projection 169 is contiguous to the bimetal 77 of the circuit breaker in the compartment 15 (FIG. 2). When the solenoid 159 is actuated, the lever 163 rotates slightly counterclockwise, whereupon the projection 169 moves the bimetal 77 a sufficient distance to trip the circuit breaker.

The lever 163 is so constructed that it is free from any binding and suitable for easy assembly. Moreover, the lever being composed of insulating material prevents electrical currents from flowing from the solenoid to the bimetal 77. The grounded neutral conductor 135 is housed within the restricted confines of the molded housing so that essentially a suitable mechanical insulation is achieved. The adapter 173 is constructed to enhance electrical attachment and to provide for strain relief of the assembled members. The test circuit means is arranged to exclude the need for a separate housing. By providing molded housing members adapted to confine $t =$ various parts in place a restricted movement of the parts including the transformer coils, the trip circuit and the associated resistor enhance reliability and positional individuality.

Figure 6:
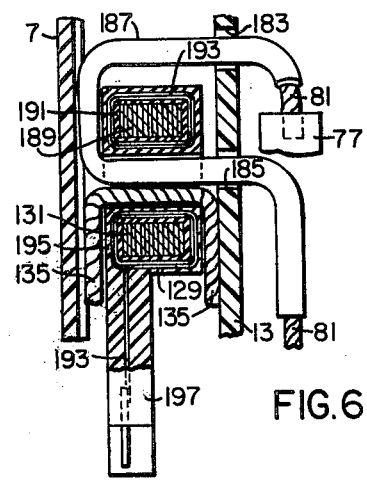
FIG. 6 is a sectional view taken on the line VI—VI of FIG. 4.

The portion of the neutral conductor 135 extending through the core 153 of the output transformer 151 comprises an adapter 173, the right end of which, as shown in FIG. 4, is connected at 175 to the cable portion of the conductor 135. The left end of the adapter 173 is connected to a lead wire 177 (FIG. 7) which is part of a test circuit to be described hereinbelow. An intermediate portion of the adapter 173 includes a U-shaped part 179 which extends through the core 153 as the secondary winding thereof and which is connected at 181 to a continuation of the cable portion of the conductor 135. As shown in FIGS. 4 and 6 the cable portion 135 extends through the core 131 of the transformer 129 and continues to the terminal 147.

As shown in FIGS. 2 and 6 the flexible conductor 81 extends through an opening or aperture means 183 from the upper end of the bimetal 77 and around and through the toroidal core 131 in the compartment 27 and then through an opening or aperture means 183 in the partition wall 13, where it re-enters the compartment 15 and is connected to the terminal strap 83 as set forth above. An insulating cover 187 covers the flexible conductor 81 to prevent its electrical contact with any portion of the ground fault circuit interrupter such as the neutral conductor 135 in the core 131 of the transformer 129.

To provide a mechanical advantage, the lower portion of the lever 163 is slightly longer than the upper portion thereof so that a solenoid 159 of lesser force is required for the desired movement of the lower end of the lever against the bimetal 77. After tripping a conventional latch spring on the bimetal 77 automatically repositions the solenoid lever for the next stroke.

As shown more particularly in FIG. 6, the toroidal core 131 comprises a stack of laminated rings 189 of an iron base composition which rings are encased within a cover 191 of an electrically insulating material. A coil 193 encircles the assembly of the laminated rings 189 and the cover 191 and the assembly of the rings, cover and coil are encased within an outer cover 195. The outer cover 195 has an outwardly extending arm portion 197 in which the two leads of the coil 193 are embedded and extend through the trip circuit 139 (FIG. 7).

To enable periodic verification of the ground fault circuit breaker structure 3, a test circuit 199 (FIG. 7) is provided and excludes the need for a separate housing for the test switch means. The test circuit includes a manual button 201 which closes a circuit between the wire 177 (FIG. 7) and a wire 203, the latter of which leads to the neutral conductor 135 ahead of the differential transformer 129 as well as to the trip circuit 139.

Although the foregoing test circuit including the wire 203 leading in the aforementioned manner is preferred, an alternate circuit may be used which comprises a wire 205 leading from the button 201 to the trip circuit side of the primary winding 155 of the output transformer 153.

Operation of the structure 3 is essentially revealed in FIG. 7. It is assumed, for example, that the line conductor 133 is connected to an electrically hot stab of a load center through a plug-in or bolt-on type of breaker and the contact interrupting means are the breaker contacts so that any current utilized by any portion of the structure will pass through the contacts and be sensed by the bimetal 77 for overload or short circuit. The supplying voltage for the electronic means is therefore predicted requiring no external fusing.

The ground fault detector having the low energy sensing coil windings is uniquely isolated from the load current except for the flexible conductor 81 by the partition wall 13. Moreover, the sensor coil embodies a particular construction for nullifying unwanted stray signals so that the sensor in the immediate vicinity of the large current carrying conductor 81 is essentially unaffected.

Another embodiment of the invention is shown in FIGS. 8 and 9 in which a bolt-on line terminal 31a is provided as an alternative for the clip-on line terminal 31. The terminal 31a is rigidly electrically connected at its upper end to the stattionary contact 21 and within the housing 5. The lower end of the terminal 31a includes a bolt-receiving opening 31b by which the terminal may be electrically connected to a load center bus bar.

In conclusion, the ground fault detector portion is separately housed from the heavy current circuit breaker side so that no undue influences occur from any debris or sparks which might develop in the circuit breaker section due to interruptions of circuit occurring from overloads or short circuits. Finally, the ground fault circuit breaker structure offers a side-by-side relationship that enables the transfer of sense function through the lever to the bimetal latch of the circuit breaker.

What is claimed is:

1. A ground-fault circuit interrupter for use in a load center and comprising a circuit breaker, a ground-fault detector, and an insulation housing therefor and having a partition forming first and second side-by-side compartments, the partitions having aperture means and a slot therethrough; the circuit breaker being in the first compartment and comprising a pair of cooperable contacts operable between open and closed positions, an operating mechanism for operating the contacts and comprising a pivotally supported releasable member, latching means for latching the releasable member and including a trip member, the latching means including a bimetal member movable between latched and unlatched positions, the trip member being pivotally mounted on the side of bimetal member and adjacent to the releasable member, the trip member being movable to release said releasable member from the latched position, a load terminal structure in the first compartment, a line terminal structure, a line conductor of an A.C. electrical distribution system connecting the trip member to the load terminal structure, the bimetal member being adjacent to the aperture means and the slot; the ground-fault detector being in the second compartment and comprising a current monitoring core, a plurality of primary windings on the core, each being one of the line and a neutral conductor of the A.C. electrical distribution system, a secondary winding sensing current imbalance between the primary windings, means responsive to a predetermined sensing signal to open said line conductor, the monitoring core being on the side of the partition opposite the bimetal member and adjacent to the aperture means; the line conductor extending from the bimetal member in the first compartment and through the aperture means and through the monitoring core in the second compartment and back through the aperture means to the load terminal structure in the first compartment, the circuit extending from the bimetal member through the line conductor from the first compartment and through the core in the second compartment and back into the first compartment and to the load terminal structure, the means responsive to a predetermined sensing signal including a lever having a pivot unaligned with the slot and having a projection extending through the slot, and the projection being movable arcuately within the slot and against the trip member to unlatch the releasable member.

* * * * *